United States Patent
Hasegawa

[11] Patent Number: 6,092,520
[45] Date of Patent: Jul. 25, 2000

[54] COOKING CONTAINER

[76] Inventor: Tokuichiro Hasegawa, 61-1, Aza-Ryuu, Shinmaiko, Chita-city, Aichi-ken, Japan

[21] Appl. No.: 09/167,383

[22] Filed: Oct. 6, 1998

[30] Foreign Application Priority Data

Apr. 1, 1998 [JP] Japan .................. 10-088842

[51] Int. Cl.[7] ..................................... A47J 37/10
[52] U.S. Cl. .................. 126/390; 220/573.1; 220/912
[58] Field of Search ............... 126/390; 99/422, 99/425, 445; 220/573.1, 912

[56] References Cited

U.S. PATENT DOCUMENTS

| | | | |
|---|---|---|---|
| 1,216,973 | 2/1917 | Epprecht | 126/390 |
| 2,534,407 | 12/1950 | Bramberry | 126/390 |
| 3,799,048 | 3/1974 | Finley | 99/425 |
| 3,934,748 | 1/1976 | Racz | 220/573.1 |
| 4,629,866 | 12/1986 | Proctor | 126/390 |
| 5,809,630 | 9/1998 | Coissard | 126/390 |

FOREIGN PATENT DOCUMENTS

| | | | |
|---|---|---|---|
| 2415995 | 10/1979 | France | 126/390 |
| 4-15141 | 4/1992 | Japan . | |

Primary Examiner—Ira S. Lazarus
Assistant Examiner—Sara Clarke
Attorney, Agent, or Firm—Michael J. Striker

[57] ABSTRACT

A cooking container has a dual structure composed of an inside container formed with a thin metal plate and an outside container formed with a thick metal plate. The heating and cooking surface of the inside container is finished with a fine porous surface by etching, and the heating and cooking surface is formed with many concaves and convexs by press forming, thereby enabling to avoid scorching and sticking of a material under cooking to this surface.

10 Claims, 4 Drawing Sheets

COOKING CONTAINER

BACKGROUND OF THE INVENTION

The present invention relates to improvements of frying pans, skillets, pots and other cooking containers made of metal.

Metal cooking containers conventionally sold on the market are known as products fabricated of single or multiple metals, or as products treated by coating fluorine resin on the cooking surface.

Typical as cooking containers of the single or multiple metals are frying pans, pots, pans and others made of iron, stainless steel, aluminum or cooper. When materials (food) to be cooked are heated, the container is in general coated on the surface with oils, fats as butters or moisture.

However, since the existing cooking containers are flat and smooth in the heating and cooking surface, while the oil, fat or moisture stay thereon, the food under cooking is not scorched and stuck on the surface, but when they vanish due to oxidation at high temperature, vaporization or absorption, the food in contact with the heated metal surface at the high temperature invites soon oxidized films or oxides (carbides), and scorched, baked and stuck to the cooking surface.

If the cooking container of the single or multiple metal is once scorched and stuck on the metal surface, oxidation, corrosion or damage are caused in such spots, and when again heating and cooking, the material under cooking is easily scorched and stuck there.

The aluminum cooking container is slowly worn and spoiled during repeatedly using, even if an alumite corrosion resistant treatment is made on the surface, and such treatment vanishes at last, and an aluminum as basic material is exposed. An aluminum content flows out during cooking, gets to the cooking materials, and it injures health by repeatedly ingesting it.

For making up for such defects, many kinds of products are exhibited on the market, which are treated with coatings of fluorine resin (Teflon) on the heating and cooking surface of metal cooking containers. However, in those cooking containers, fluorine resin itself has problems to health. Further, since the coating surface is a soft property, it becomes worn and disappears while a metallic spatula is often used, and the coating comes off and the material under cooking is stuck to.

The present inventor proposed, in Japanese Utility Model Publication No. 4-15141, a cooking container with less scorching and sticking which had a heating part of a dual structure formed with an air layer with an interior part thereof. Since this cooking container controls a space between an inner container and an outer container with a screw or the like so as to regulate a heat convection in the air layer, it is more or less complicated mechanically and expensive.

SUMMARY OF THE INVENTION

It is a main object of the invention to provide a cooking container with less or no scorching and sticking b y fundamentally improving a property of the heating and cooking surface and a structure of the cooking container, not treating any coating on the heating and cooking surface.

It is another object of the invention to provide a cooking container which is safe in health without flowing out of fluorine or aluminum content.

It is a further object of the invention to provide a cooking container simple in a structure and cheaply manufactured, keeping the above mentioned characteristic properties.

For the above objects, the present invention is to form fine porous face on the heating and cooking surface of the metal cooking container.

Metallic materials are not in particular limited, but main are iron, copper, stainless steel or alloy steel containers, and those metallic materials may be combined with aluminum or duralumin plates which are good in heat conductivity and light weighted.

"Fine porous face" to be formed on the upper pace of the heating and cooking surface of the metal cooking container means such an arrangement where considerably fine pores (unevennesses) are much formed on the heating and cooking surface. Makings therefor are arbitrary, and for example, if a metal surface to become a heating and cooking surface is pre-treated with chemicals as sulfuric acid or hydrochloric acid and effected with etching, the metal surface may be provided with rough finishing of e.g., difference in height of unevenness of around 20 to $1000\mu$ and etching depth of around $1000\mu$.

Further, the metal surface to be a cooking side may be roughly finished by physically or mechanically etching, or by sand blast treatment with quartz sands of #20 to #80, or roughly finished of difference in height of unevenness of around 20 to $4000\mu$ by shot blast treatment with shots of around 0.5 to 5.0 mm grain diameter. If the treatment of the above chemicals is added to the sand blast or shot blast, a more excellent porous face may be provided.

By forming the fine porous face in the heating and cooking surface, oils, fats or moisture from the cooking material go into and adhere the pores of the heating and cooking surface so that this surface is always wet with fats and oils, and forming films of fats and oils. The cooking material is less schorched and stuck while heating and cooking.

In the present invention, much unevenness (second unevenness) may be formed to the porous cooking side. Difference in height of unevenness is around 50 to $6000\mu$ and is formed by e.g., press working. The forming of these unevennesses makes a touch area to the cooking face small, so that a scorch avoiding effect is further enhanced together with said fine porous face.

According to one embodiment of the present invention, the cooking container is composed of an inside container having the heating and cooking surface formed with the fine porous surface and/or many unevennesses and an outside metal container arranged outside of the inside container. The outside container is composed of a metal material having better heat conductivity than that of the inside container.

The inside container is made of e.g., iron, copper or stainless steel, and the outside container is made of e.g., aluminum or duralumin.

According to another embodiment of the present invention, the outside container is disposed outside of the inside container via a cavity serving as an air layer; and the outside container is formed at an upper part with an air hole for passing the open air flow into the cavity, and with an air controller for controlling an air content flowing in the cavity. This air controller may be provided with an opening cover for opening-closing the air hole.

DESCRIPTION OF PREFERRED EMBODIMENTS

Figure 1:
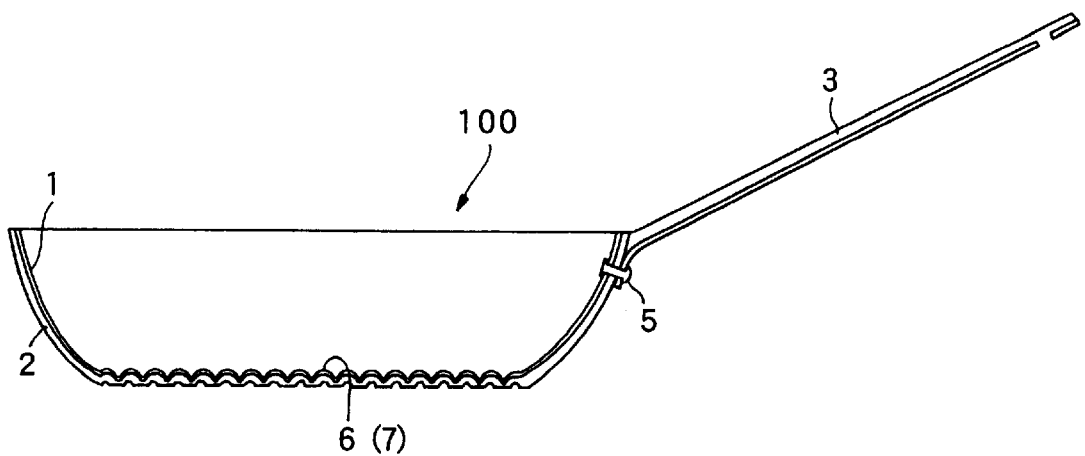
FIG. 1 is a cross sectional view showing a first embodiment of the present invention.
Figure 2:
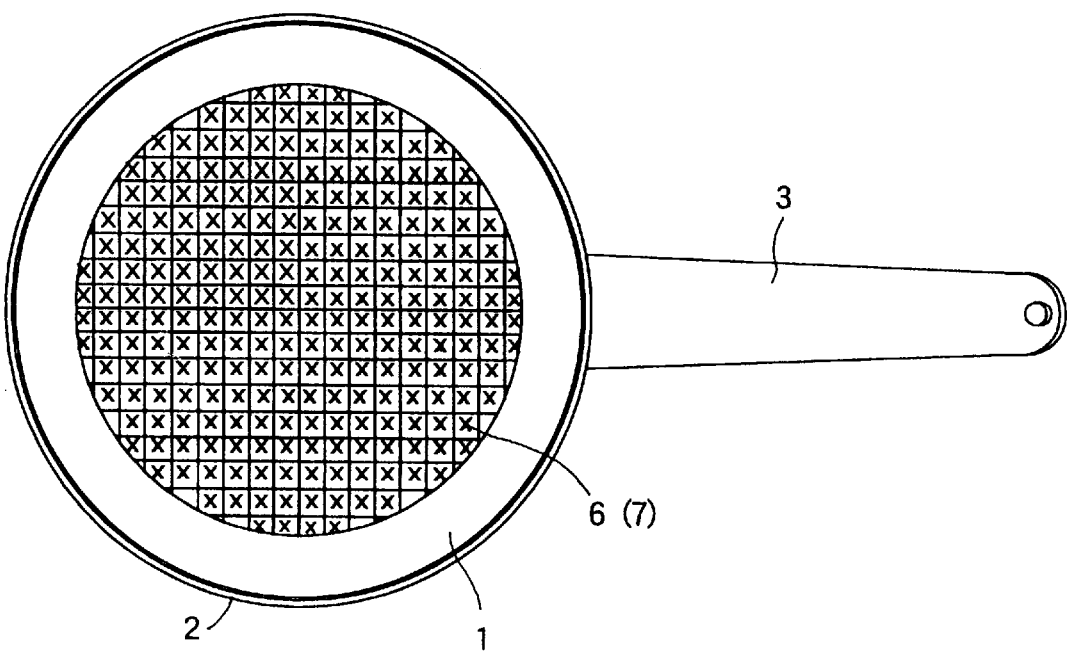
FIG. 2 is a plan view of the first embodiment.

FIGS. 1 and 2 show the first embodiment of the present invention. A cooking container 100 includes an inside container 1, an outside container 2 and a grip 3. The inside container 1 is made of an iron, copper or stainless steel plate of a small thickness (around 0.3 to 3.0 mm), and the outside container 2 is made of an aluminum, duralmin or copper plate of a large thickness (around 2.0 to 10.0 mm) having better heat conductivity than that of the inside container 1.

The inside container 1 and the outside container 2 may be formed by casting or die cast forming processes, if need. The grip 3 is made of a single or multiple material using an iron, stainless steel, cast, die cast, wooden, or resin plate of thermosetting property of around 0.8 to 1.5 mm thickness.

The inside container 1 and the outside container 2 are made by laminating the respective metal materials, hot rolling, welding into a one body (called a clad steel) and press forming. The grip 3 is fixed by a rivet 5 or the like at the upper parts of the outside and outside containers 1 and 2.

The whole side of the heating and cooking surface 6 of the inside and outside containers 1 and 2 is, as seen in FIG. 2, formed with many concavities and convexities 7 (uneven part) by the press forming. Actual sizes of the concavities and convexities 7 are decided depending on shapes of the cooking container or cooking purposes, and for example, difference in height of convcavities and convexities are around 50 to 4000$\mu$. The concavities and convexities 7 can be formed not only in the bottom of the container but also in the whole of the container.

The whole surface including the heating and cooking surface 6 of the inside container 1 is fine porous face. If the metal material of the inside container 1 is iron or copper. The porous surface is treated by etching such as immersing in a chemical liquid as sulfuric acid, hydrochloric acid, or nitric acid of industrial medicines. Thereby the surface of the metal material is formed with concavities and convexities of difference in height of unevenness being around 20 to 1000$\mu$ and the depth of fine pore being around 1000$\mu$.

On the other hand, if the material of the inside container 1 is an acid resistant metal as stainless, steel, the surface thereof is at first treated with a sand blast of #40 to #60, and is thereafter etching treated with ferric oxide ($Fe_2O_3$) or hydrofluoric acid so as to provide a rough finishing in the metal surface, as describing above.

By finishing the fine porous face in the metal surface of the inside container 1, if the heating and cooking surface 6 is coated with an appropriate amount of oils, fats or butter or moisture from the cooking stuff, they go into pores of the rough surface of the heating and cooking surface 6 so that this side is always wet with fats and oils (films of fats and oils are formed). These oils and fats do not evaporate or vanish but remain, and are always supplied to keep the surface property suitable for cooking.

Further, as many concavities and convexities 7 are formed in the cooking side, the cooking stuff is held by convexities on these end points, and the touch area of the cooking stuff with the cooking surface is smaller than the case of a flat cooking surface (near to a point contact).

Oils, fats coated on the heating and cooking surface 6 or moisture, stock or gravy from the cooking stuff go into fine pores or concavities and convexities, and not only adhere thereto but also flow into spaces of concavities.

This liquid is heated to swell, boil and evaporate. Thereby, a pressure acts to push up the heated stuff, and scorching and sticking are avoided together with the small touch area between the stuff to be heated and the convexities of the heating and cooking surface 6.

If a stuff under cooking is liquid or half liquid, said oils, fats or moisture are heated and they swell, boil and evaporate, and thereby a pressure acts to push up the cooking stuff, so that the cooking stuff remain on the end points of the convexities. If the stuff is scorched and stuck, it is easily separated.

The scorch avoiding effect is more enhanced due to a synergistic effect of the concavities and convexities 7 and fine porous faces formed in the surface thereof.

Figure 3:
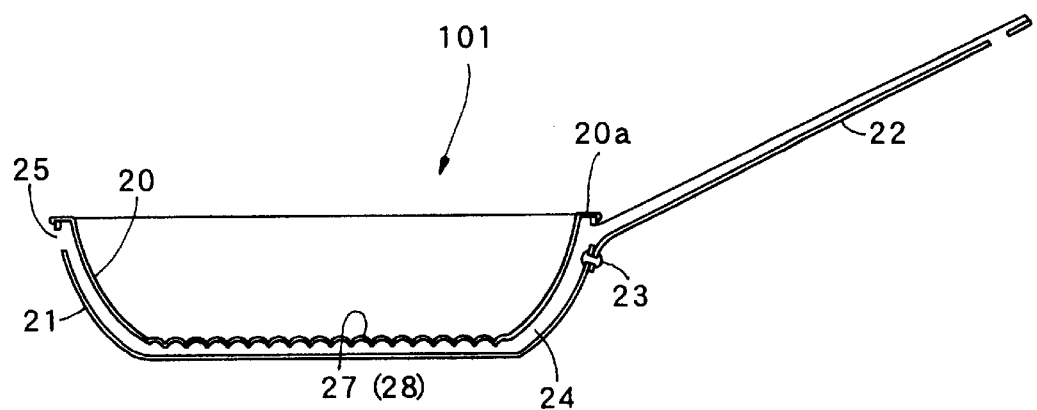
FIG. 3 is a cross sectional view showing a second embodiment of the present invention.
Figure 4:
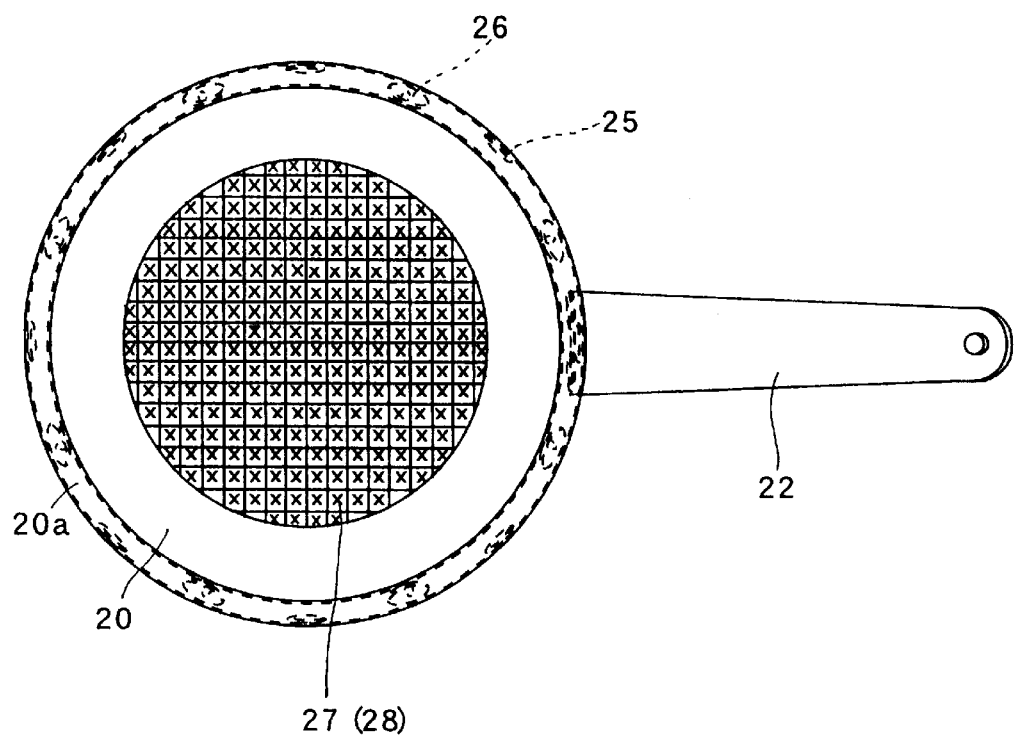
FIG. 4 is a plan view of the second embodiment.
Figure 5:
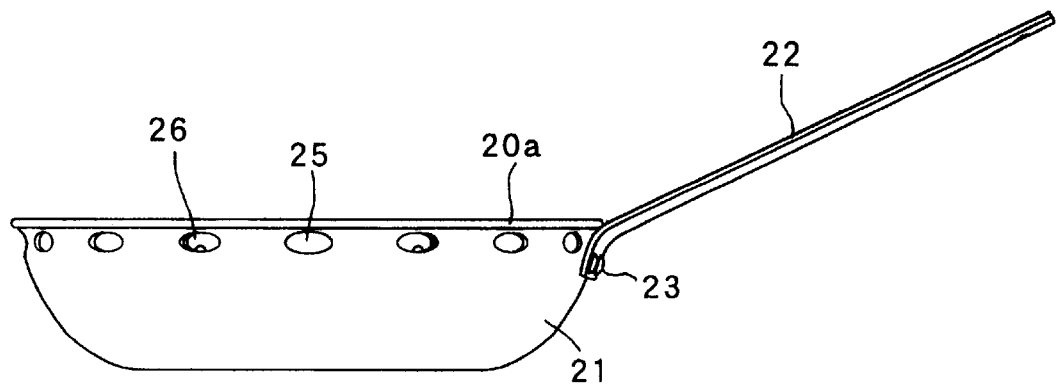
FIG. 5 is a side view of the second embodiment.

FIGS. 3, 4 and 5 show a second embodiment of this invention. This cooking container 101 includes the inside container 20, the outside container 21 and a grip 22. The grip 22 is fixed by a rivet 23 at an upper appropriate part.

The inside container 20 and the outside container 21 are, as seen in FIG. 3, connected with a predetermined space (dual structure) to form a cavity (air layer) 24. Herein, the upper end 20a of the inside container 20 is bent outward and fixed with calking or welding at the upper end of the outside container 21.

In the circumference of the upper end of the outside container 21, a plurality of air circulating holes 25 and opening holes 26 for controlling an air content flowing in the cavity 24 are alternately formed as shown in FIGS. 4 and 5. The air circulating hole 25 opens in oval at the upper part of the outside container 21, and the cavity 24 always communicates with an open air.

Figure 6:
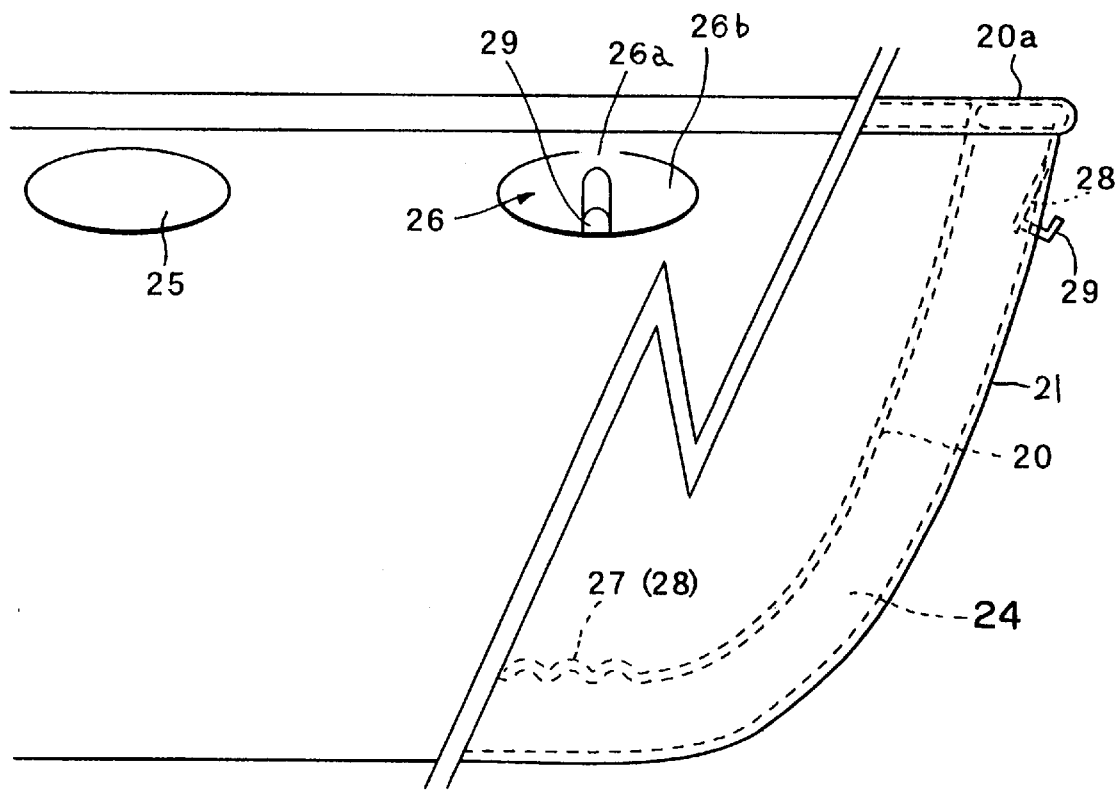
FIG. 6 is a partially enlarged view for explaining the second embodiment.

The opening hole 26 is, as seen in FIG. 6, provided with a cover 26b opening and closing at a hinge part 26a. The cover 26b is opened in oval except a portion to be a hinge 26a at the upper part of the outside container 21, while the cover 26b is slit like a tongue which is bent in L shape outward so as to form a thumb 29.

There are formed many concavities and concavities 28 in the heating and cooking surface 27 of the inside container 20, the surface of the concavities and convexities being formed in porous surface as FIGS. 1 and 2.

The outside container 21 is flat herein. The metal materials and the thickness of the inside and outside containers 20, 21 are the same as in FIGS. 1 and 2.

According to the above embodiment, when the bottom of the outside container 21 is heated, a direct heating of the inside container 20 supporting the stuff under cooking can be avoided by the heat insulating effect of the air layer in the cavity 24, and since the stuff is indirectly heated, it is made less scorched and stuck. Further, by the convection of heat conductivity of the air layer, a temperature of the air layer is uniformly transferred over the bottom of the inside container to keep it a predetermined temperature (refer to Laid Open Utility Model Specification 4-15141).

In addition to such effects, when a high temperature is required for cooking, the thumb 29 is hooked by a finger or a tool, and the cover 26b of the opening hole 26 is closed, thereby to let the air of a minimum necessary amount enter the cavity 24 via the air circulating hole 25. And so the circulation of the air layer in the cavity 24 is lessened, the air layer is heated at a high temperature and is transferred to the inside container 20. Thus, cooking at high temperature is possible.

If the cover 26 is expanded to make the air easily flow into, the air of much amount goes into the cavity 24, and the circulating of the air is active and the air temperature within the cavity 24 does not exceed a predetermined level, and continuously keeps at proper degrees (low temperature). Temperatures may be controlled optionally by opening and closing the cover 26b.

Shapes or arrangements of the air circulating hole 25 and the opening hole 26 and an opening mechanism of the cover 26b can be arbitrarily changed if necessary.

Figure 7:
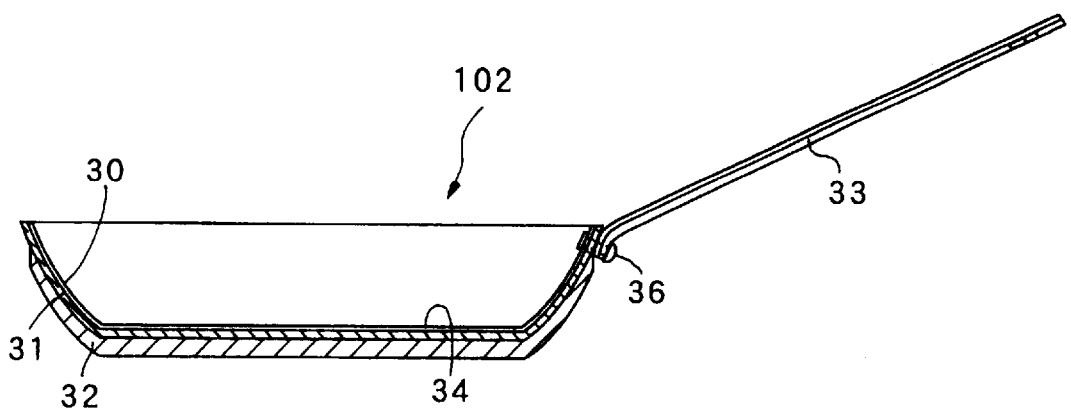
FIG. 7 is a cross sectional view showing a third embodiment of the present invention.
Figure 8:
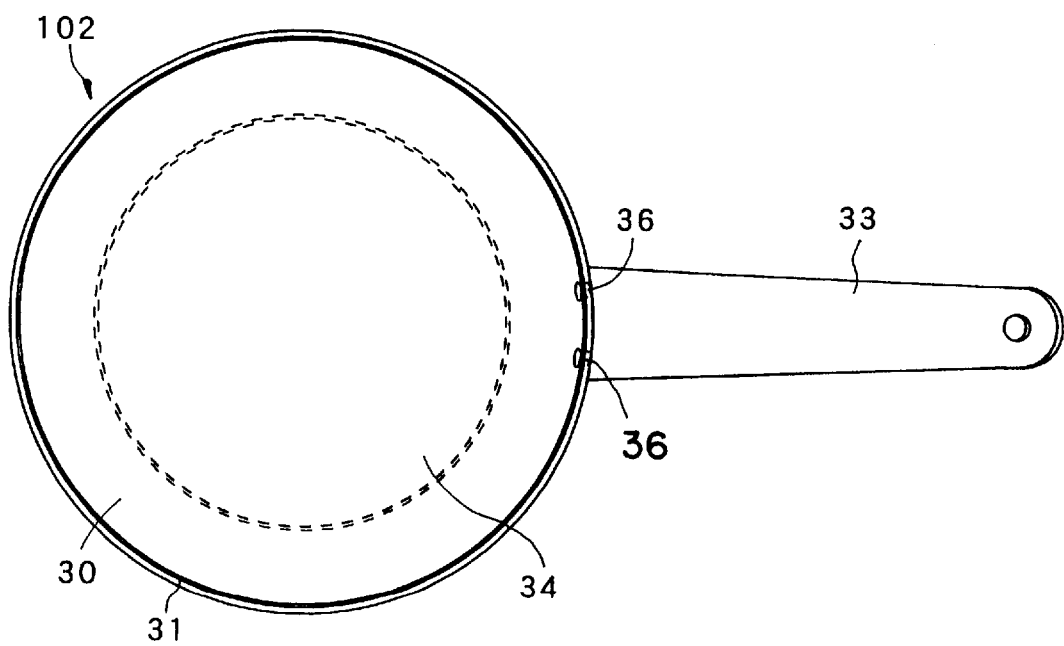
FIG. 8 is a plan view of the third embodiment

FIGS. 7 and 8 show the further embodiment of the invention. This cooking container 102 includes an inside container 30, a middle container 31, an outside container 32 and a grip 33. The grip 33 is fixed by a rivet 36 at upper appropriate parts of the middle container 31 and the inside container 30.

The inside container 30 is composed of an iron, copper or stainless steel plate of a small thickness (around 0.3 to 3.0 mm), and the middle container 31 is composed of a metal plate as aluminum, duralumin or copper thicker (around 2.0 to 5.0 mm) than the inside container 30 and having excellent heat conductivity. The outside container 32 is composed of an aluminum or duralumin plate of a large thickness (around 2.0 to 10.0 mm).

The grip 33 is composed of a single or multiple material using a thick iron or stainless steel plate, a cast or die cast, wooden product, or resin product of thermosetting property of around 0.8 to 1.5 mm thickness. These inside container 30, the middle container 31 and the outside container 32 are made a one body (clad steel) by baking, cladding, fusing or welding, and are formed by a pressing. The surface of the heating and cooking surface 34 of the inside container 30 is finished with the above mentioned porous face. In this embodiment, concaves and convex are not formed in the cooking surface 34, but if required, these may be formed by the pressing.

In general, if the thickness of a single metal material is made large, defects as nonuniform heating or partially rapid heating are decreased to a certain extent, and if the thickness of a material is iron, copper or stainless steel of large specific gravity is made large, the cooking is difficult. The cooking container shown in FIGS. 7 and 8 uses, therefore, a thin metal plate for the inside container 30, and uses a thick metal plate of light weight and good heat conductivity for the middle container 31. If problems are involved only with these double structures and nonuniform heating, a further metal plate of the good heat conductivity is laminated to make a triple structure. In view of strength, decoration, cost and other, the triple structure may be made with thin metal plates of other kinds.

In the above mentioned embodiments, the cooking containers are produced by press forming the inside container 1 and the outside container 2 with an iron, stainless steel or copper plates. For cooking purposes, materials are changed to products formed by castings or die casting, not limiting to the above mentioned metal plates, otherwise multiple complicated products by the casting or die casting may be available.

The above mentioned embodiments are only some examples of the present invention, and the cooking containers are applicable to not only the frying pan, but cauldrons, pots, or other cooking containers. The porous surfaces or concavities and convexities 7, 28 may be formed in all over the surface of the inside container, not limiting to the cooking surface only.

Not only the inside container but also the outer and rear surfaces of the outside container are formed with concavities and convexities or treated with sand blast or shot blast to make the surface area further large to lessen the nonuniform heating by burners, and heighten the properties having the heat absorption and conductivity. The shapes and sizes of the concavities and convexities 7, 8 may be optionally altered if needed. The shown embodiments are convenient for explaining the invention and detailed structures can be changed as required.

As mentioned above, the cooking container of the invention is less or no scorching and sticking by improving the surface property of the heating and cooking surface and the structure of the cooking container, not coating fluorine resin on the heating and cooking surface.

In addition, the fluorine resin or aluminum content do not flow out, and are safe in food hygiene. The iron content necessary to a human body flows out from the iron as a blank material for the inside container and the stainless steel, and adheres to the cooked stuff and much iron content may be ingested.

While maintaining the above characteristic properties, the invention brings about effects that structures are simple and may be cheaply manufactured.

What is claimed is:

1. A cooking container, comprising,
    an inside container composed of metal and having a heating and cooking surface which is formed porous by etching treatment;
    an outside container composed of metal and having higher heat conductivity than that of said inside container; and
    a cavity serving as an air layer disposed between said inside container and said outside container and having an air flowing hole for circulating an open air into said cavity.

2. A cooking container as defined in claim 1, wherein said air flowing hole is provided with an air controller for controlling an air content flowing into said cavity.

3. A cooking container as defined in claim 1, wherein said air flowing hole is provided with a cover for opening and closing.

4. A cooking container as defined in claim 1, wherein said heating and cooking surface of said inside container is formed with concavities and convexities.

5. A cooking container as defined in claim 1, wherein said outside container is thicker than said inside container.

6. A cooking container as defined in claim 1, wherein said porous heating and cooking surface has a roughing face of difference in height of unevenness of $20\mu$ to $1000\mu$.

7. A cooking container, comprising,
    an inside container composed of metal and having a heating and cooking surface which is formed porous by etching treatment;
    an outside container composed of metal and having higher conductivity than that of said inside container,
    a middle container composed of metal, interposed between said inside container and said outside container, and having a thickness greater than that of said inside container and heat conductivity higher than that of said inside container,
    said inside container, said middle container and said outside container being fixed to each other and forming one body.

8. A cooking container, comprising an inside container having a porous heating and cooking surface; an outside container composed of metal and having a higher heat conductivity than that of said inside container, said outside container being united with said inside container, said heating and cooking surface being provided with a plurality of concavities and convexities.

9. A cooking container as defined in claim 8, wherein said outside container is disposed relative to said inside container so that a cavity serving as an air layer is formed therebetween, said cavity being provided with an air flowing hole for circulating an open air into said cavity.

10. A cooking container as defined in claim 8, and further comprising an air controller for controlling an air content flowing in said cavity.

* * * * *